(12) United States Patent
Papsai

(10) Patent No.: US 9,630,864 B2
(45) Date of Patent: Apr. 25, 2017

(54) SEAWATER PLANT WITH INCLINED AERATION AND MIXED AUTO RECOVERY

(71) Applicant: ALSTOM Technology Ltd, Baden (CH)

(72) Inventor: Pal Papsai, Växjö (SE)

(73) Assignee: General Electric Technology GmbH, Baden (CH)

( * ) Notice: Subject to any disclaimer, the term of this patent is extended or adjusted under 35 U.S.C. 154(b) by 50 days.

(21) Appl. No.: 14/741,742

(22) Filed: Jun. 17, 2015

(65) Prior Publication Data

US 2016/0368795 A1   Dec. 22, 2016

(51) Int. Cl.
| | |
|---|---|
| B01F 3/04 | (2006.01) |
| C02F 1/72 | (2006.01) |
| C02F 1/74 | (2006.01) |
| C02F 101/10 | (2006.01) |
| C02F 103/18 | (2006.01) |
| C02F 103/08 | (2006.01) |

(52) U.S. Cl.
CPC ............ *C02F 1/72* (2013.01); *C02F 1/727* (2013.01); *C02F 1/74* (2013.01); *B01F 2003/04156* (2013.01); *B01F 2003/04191* (2013.01); *B01F 2003/04872* (2013.01); *B01F 2003/04879* (2013.01); *C02F 2101/101* (2013.01); *C02F 2103/08* (2013.01); *C02F 2103/18* (2013.01); *F23J 2900/15041* (2013.01)

(58) Field of Classification Search
CPC .... C02F 1/72; C02F 1/727; C02F 1/74; C02F 7/00; C02F 2103/08; C02F 2103/18; C02F 2101/101; B01D 53/504; B01D 53/73; B01D 53/75; B01D 53/1481; F23J 2219/40; F23J 2900/15041; B01F 3/04106; B01F 3/04439; B01F 3/04113; B01F 2003/04156; B01F 2003/04184; B01F 2003/04191; B01F 2003/04865; B01F 2003/04872; B01F 2003/04879; B01F 2003/04886

See application file for complete search history.

(56) References Cited

U.S. PATENT DOCUMENTS

| | | |
|---|---|---|
| 4,336,035 A | 6/1982 | Evenstad et al. |
| 4,502,872 A | 3/1985 | Ivester et al. |
| 5,484,535 A | 1/1996 | Downs |

FOREIGN PATENT DOCUMENTS

| | | |
|---|---|---|
| CN | 201240931 | 5/2009 |
| EP | 1 040 864 A2 | 10/2000 |
| EP | 2 578 544 A1 | 10/2013 |
| GB | 2 159 508 A | 12/1985 |

(Continued)

OTHER PUBLICATIONS

CA Temple et al., Optimization of expression of human sulfite oxidase and its molybdenum domain, Archives of Biochemistry and Biophysics, Nov. 15, 2000, 281-287, vol. No. 383, Issue No. 2.

*Primary Examiner* — Lucas Stelling

(74) *Attorney, Agent, or Firm* — GE Global Patent Operation; Rita D. Vacca

(57) ABSTRACT

A method of treating effluent seawater generated in the removal of sulfur dioxide from a process gas by contacting the process gas containing sulfur dioxide with seawater, using inclined aeration and mixed auto recovery is provided. Additionally, an inclined aeration and mixed auto recovery seawater oxidation basin system for treating effluent seawater generated in the removal of sulfur dioxide from a process gas by contacting the process gas containing sulfur dioxide with seawater is provided.

15 Claims, 5 Drawing Sheets

(56) References Cited

FOREIGN PATENT DOCUMENTS

| | | |
|---|---|---|
| JP | 59213495 | 12/1984 |
| JP | H0352623 A | 3/1991 |
| JP | 2008207149 A | 9/2008 |
| JP | 2012115764 A | 6/2012 |
| TW | 201016618 A | 5/2010 |
| TW | 201034973 A | 10/2010 |
| WO | 88/07023 | 9/1988 |
| WO | 01/41902 | 6/2001 |
| WO | 2008/105212 | 9/2008 |
| WO | 2013/146143 | 10/2013 |

SEAWATER PLANT WITH INCLINED AERATION AND MIXED AUTO RECOVERY

TECHNICAL FIELD

The present disclosure relates to a method of treating effluent seawater generated in the removal of sulfur dioxide from a process gas by contacting the process gas containing sulfur dioxide with seawater, using inclined aeration and mixed auto recovery.

The present disclosure further relates to an inclined aeration and mixed auto recovery seawater oxidation basin system for treating effluent seawater generated in the removal of sulfur dioxide from a process gas by contacting the process gas containing sulfur dioxide with seawater.

BACKGROUND ART

Process gases containing sulfur dioxide, $SO_2$, are generated in many industrial processes. One such industrial process is the combustion of a fuel, such as coal, oil, peat, waste, or the like in a combustion plant, such as a power plant. In such a power plant, a hot process gas, often referred to as a flue gas, is generated containing pollutants including acid gases, such as sulfur dioxide, $SO_2$. Removal of as much of the acid gases as possible from the flue gas is necessary before the flue gas may be released to the atmosphere or ambient air. Another example of an industrial process in which a process gas containing pollutants is generated is the electrolytic production of aluminum from alumina. In that process, flue gas containing sulfur dioxide, $SO_2$, is generated within venting hoods of electrolytic cells.

WO 2008/105212 discloses a boiler system comprising a boiler, a steam turbine system, and a seawater scrubber. The boiler generates, by combustion of a fuel, high-pressure steam utilized in the steam turbine system for generating electric power. Seawater is collected from the ocean, and is utilized as a cooling medium in a condenser of the steam turbine system. The seawater is then utilized in the seawater scrubber for absorbing sulfur dioxide, $SO_2$, from flue gas generated in the boiler. Sulfur dioxide, $SO_2$, is absorbed in the seawater and forms sulfite and/or bisulfite ions. Effluent seawater from the seawater scrubber is forwarded to an aeration pond. Air is bubbled through the effluent seawater in the aeration pond for oxidation of the sulfite and/or bisulfite ions to sulfate ions for release back to the ocean together with the effluent seawater. The sulfite and/or bisulfite ions are oxidized in the aeration pond to sulfate ions by means of oxygen gas contained in the air bubbled through the effluent seawater.

EP 2578544 A1 discloses a seawater oxidation basin system for treating effluent seawater. The disclosed oxidation basin system includes a first supply pipe for distributing an oxidation enhancing substance in the effluent seawater, a second supply pipe for distributing an oxidation enhancing substance in the effluent seawater, and a control device for controlling a first amount of oxidation enhancing substance supplied by one of the first and second supply pipes independently from a second amount of oxidation enhancing substance supplied by the other one of the first and second supply pipes.

JP 2012/115764 A discloses a seawater flue gas desulfurization system comprising a flue gas desulfurization tower in which a flue gas is brought into gas-liquid contact with seawater to carry out a desulfurization reaction of sulfur dioxide ($SO_2$) to sulfurous acid ($H_2SO_3$). A diluting mixing tank is provided at a lower side of the flue gas desulfurization absorption tower for mixing of sulfur-containing used seawater with fresh seawater for dilution of the sulfur-containing used seawater. Further, an oxidation tank is provided on a downstream side of the diluting mixing tank equipped with an aeration apparatus for carrying out water quality recovery treatment of the seawater used for dilution, and a wastewater channel. The wastewater channel has multiple steps of partition walls, the height of which are made to be successively lower from an upstream side to a downstream side.

WO 2013/146143 A1 discloses a seawater desulfurization and oxidation treatment device including an oxidation/aeration tank for performing water quality restoration treatment on acid desulfurization seawater containing sulfurous acid ($H_2SO_3$). This acid desulfurization seawater is generated by subjecting exhaust gas from a boiler to seawater desulfurization, using dilution seawater and air. The oxidation/aeration tank is configured comprising a main flow path having an upstream-side weir formed on the inlet side in the longitudinal direction of the oxidation/aeration tank into which the dilution seawater is introduced. The oxidation/aeration tank also includes an upstream-side mixing portion formed on the upstream side from the upstream-side weir for mixing the acid desulfurization seawater with the dilution water while introducing the acid desulfurization seawater therein. A sub flow path supplies the dilution water detoured from the upstream—side mixing portion of the oxidation/aeration tank, to post-dilute the acid desulfurization seawater oxidized and aerated in the oxidation aeration tank.

The above background art illustrates the fact that generally seawater treatment plant designs provide for flat bottomed basins/ponds equipped with air blowers for maintaining oxidation air, and a weir downstream of the aeration basin followed by a discharge basin/pond/channel. Further, seawater treatment basins are in general designed to have two different zones: a mixing zone for the mixing of absorber effluent seawater and fresh seawater for dilution; and an aeration zone equipped with air blowers for seawater sulfite oxidation. In the interest of reducing capital expenses and operational expenses associated with seawater treatment plants, new methods and systems for treating effluent seawater are needed.

SUMMARY OF THE DISCLOSURE

The present disclosure relates to a method of treating effluent seawater generated in the removal of sulfur dioxide from a process gas by contacting the process gas containing sulfur dioxide with seawater, using inclined aeration and mixed auto recovery. The present disclosure further relates to an inclined aeration and mixed auto recovery seawater oxidation basin system for treating effluent seawater generated in the removal of sulfur dioxide from a process gas by contacting the process gas containing sulfur dioxide with seawater. As such, the subject method and system for treating effluent seawater uses a combined inclined aeration basin for both mixing the effluent seawater with fresh seawater and oxidizing the effluent seawater using an inclined aeration system. This combined inclined aeration basin is then followed downstream by two pH and dissolved oxygen pH/DO auto recovery basins, which together provide a more cost efficient system as compared to the above noted background systems with respect to both capital investment and operation thereof.

According to the subject disclosure, a system for treating effluent seawater generated in the removal of sulfur dioxide from a process gas by contacting the process gas containing sulfur dioxide with seawater, using an inclined aeration and mixed auto recovery basin is provided. As such, the subject system comprises a basin with a flat bottomed first area of approximately 10 meters to approximately 20 meters in length equipped with effluent seawater distribution pipes, followed by an inclined bottom second area of approximately 20 meters to approximately 30 meters in length equipped with gas distribution pipes. The depth of the flat bottomed first area measures approximately 6 meters. The depth of the shallowest point of the inclined bottom second area measures approximately 2 meters to approximately 2.5 meters. As fresh seawater flows downstream within the subject aeration basin, effluent seawater is supplied into the flat bottomed first area just upstream and adjacent to the inclined bottom second area via effluent seawater distribution pipes. Effluent seawater is supplied from effluent seawater distribution pipes such that effluent seawater flowing from the effluent seawater distribution pipes is contacted at approximately a 90° angle by an oxidation agent such as air, oxygen or other oxygen source supplied from the gas distribution pipes. The inclined bottom second area providing an oxidation agent at an angle of approximately 90° with respect to the flow of effluent seawater from the effluent seawater distribution pipes enhances the mixing of the fresh seawater, the effluent seawater and the oxidation agent thereby increasing sulfite oxidation efficiency within the effluent seawater. Also, by providing an oxidation agent at an angle of approximately 90° with respect to the flow of effluent seawater from the effluent seawater distribution pipes, less aeration power demand is required, e.g., up to 50 percent reduction in blower capacity demand, in a reduced effluent seawater treatment system footprint, e.g., up to 40 percent reduction, as compared to conventional commercial effluent seawater treatment systems. For control of the described system, a weir is provided to control the depth of the effluent seawater within the aeration basin thereby controlling the effluent seawater retention time within the aeration basin. Further, a sulfite sensor is used to control sulfite oxidation within the aeration basin.

Provided downstream from the aeration basin, are two pH/DO auto recovery basins, each approximately 2 meters to approximately 2.5 meters in depth. The elevation of the aeration basin and each of the two pH/DO auto recovery basins should differ by at least approximately 0.5 meter. Such elevation differences between the aeration basin and each of the two pH/DO auto recovery basins results in two separate water cascades or waterfalls of at least approximately 0.5 meter in height to adjust the pH and dissolved oxygen concentration of the effluent seawater prior to effluent seawater discharge back to the ocean.

According to the subject disclosure, a method for treating effluent seawater generated in the removal of sulfur dioxide from a process gas by contacting the process gas containing sulfur dioxide with seawater, using an inclined aeration and mixed auto recovery basin is provided. As such, the subject method comprises providing an aeration basin with a flat bottomed first area of approximately 10 meters to approximately 20 meters in length equipped with effluent seawater distribution pipes, followed by an inclined bottom second area of approximately 20 meters to approximately 30 meters in length equipped with gas distribution pipes. The depth of the flat bottomed first area measures approximately 6 meters. The depth of the shallowest point of the inclined bottom second area measures approximately 2 meters to approximately 2.5 meters. Fresh seawater is supplied to the aeration basin for flow downstream within the subject aeration basin. Further, effluent seawater is supplied into the flat bottomed first area just upstream of and adjacent to the inclined bottom second area of the aeration basin via horizontally arranged effluent seawater distribution pipes. Effluent seawater is supplied from effluent seawater distribution pipes such that effluent seawater flowing from the effluent seawater distribution pipes is contacted at approximately a 90° angle by an oxidation agent such as air, oxygen, or other oxygen source supplied from the horizontally arranged gas distribution pipes. The inclined bottom second area providing an oxidation agent at an angle of approximately 90° with respect to the flow of effluent seawater from the effluent seawater distribution pipes enhances the mixing of the fresh seawater, the effluent seawater and the oxidation agent thereby increasing sulfite oxidation efficiency within the effluent seawater. As such, by providing an oxidation agent at an angle of approximately 90° with respect to the flow of effluent seawater from the effluent seawater distribution pipes, less aeration power demand, e.g., up to 50 percent blower capacity reduction, is required. Additionally, due to the enhanced mixing of the fresh seawater, the effluent seawater and the oxidation agent, the required effluent seawater treatment system footprint is reduced, e.g., up to 40 percent reduction, as compared to the footprint of conventional commercial effluent seawater treatment systems. According to the subject method, a weir is provided to control the depth of the effluent seawater within the basin thereby controlling the effluent seawater retention time within the basin, and a sulfite sensor is provided to control sulfite oxidation within the basin.

The subject method likewise includes providing downstream from the basin, two pH/DO auto recovery basins of approximately 2 meters to 2.5 meters in depth. The elevation of the aeration basin and each of the two pH/DO auto recovery basins should each differ by at least approximately 0.5 meter. Such elevation differences between each the aeration basin and each of the two pH/DO auto recovery basins results in two separate water cascades or waterfalls each at least approximately 0.5 meter in height to adjust the pH and dissolved oxygen concentration of the effluent seawater prior to effluent seawater discharge back to the ocean.

In summary, the subject method of treating effluent seawater generated in removing sulfur dioxide from a process gas by contacting the process gas containing sulfur dioxide with seawater comprises supplying fresh seawater to a basin for a flow thereof downstream through an effluent seawater treatment system, supplying the effluent seawater to the basin from a flat bottom of the basin upstream of and adjacent to an inclined bottom of the basin for a flow of the effluent seawater in the flow of fresh seawater, spraying an oxidation agent from the inclined bottom of the basin at a pressure of approximately 30 kPa to approximately 50 kPa (approximately 4.35 psi to approximately 7.25 psi) to contact the flow of effluent seawater at an angle of approximately 90 degrees, flowing the fresh seawater, effluent seawater and oxidation agent over a first weir into a first pond, and flowing the fresh seawater, effluent seawater and oxidation agent over a second weir into a second pond prior to environmental release thereof. As such, the effluent seawater is supplied to the basin from an effluent seawater distribution pipe horizontally arranged in, at, or adjacent to the flat bottom perpendicular to the flow of the fresh seawater. The oxidation agent for the subject method is one or more members selected from the group consisting of air, oxygen, and an oxygen source. Above the inclined bottom, the fresh seawater, effluent seawater and oxidation agent efficiently mix in a relatively small basin area. After so mixing, the fresh seawater, effluent seawater and oxidation agent waterfall flow over the first and second weirs into the first and second ponds providing pH recovery with decarboxylation and oxygenation to produce neutralized effluent seawater for environmental release such as to the ocean. Further to the method, one or more water quality sensors are arranged in one or more of the basin, the first pond, and the second pond for use to control the effluent seawater treatment. As such, a control unit receives signals from the one or more water quality sensors arranged in the one or more of the basin, the first pond, and the second pond and based on the signals received, controls the effluent seawater treatment by adjusting one or more parameters of effluent seawater treatment.

In summary, the subject effluent seawater treatment system for treating an effluent seawater generated in a wet scrubber in which a process gas is brought into contact with seawater for removal of sulfur dioxide from said process gas, the effluent seawater treatment system comprises a basin comprising an area with a flat bottom upstream of and adjacent to an area with an inclined bottom, a fresh seawater supply supplying fresh seawater to an upstream head of the basin into the area with the flat bottom for a downstream flow thereof through the basin, an effluent seawater supply arranged horizontally at the flat bottom upstream of and adjacent to the inclined bottom for an upward flow of effluent seawater into the downstream flow of fresh seawater, an oxidation agent supply horizontally arranged at the inclined bottom to spray an oxidation agent at a pressure of approximately 30 kPa to approximately 50 kPa (approximately 4.35 psi to approximately 7.25 psi) for contact with the flow of effluent seawater at approximately a 90 degree angle, a first weir downstream of the inclined bottom for a waterfall flow of the fresh seawater, effluent seawater and oxidation agent into a first pond, and a second weir downstream of the first pond for a waterfall flow of the fresh seawater, effluent seawater and oxidation agent into a second pond prior to environmental release thereof such as in the ocean. As such, the effluent seawater supply is an effluent seawater distribution pipe horizontally arranged in, at, or adjacent to the flat bottom perpendicular to the flow of the fresh seawater. The oxidation agent of the subject system is one or more members selected from the group consisting of air, oxygen, and an oxygen source. The oxidation agent supply is one or more aeration pipes horizontally arranged in, at, or adjacent to the inclined bottom extending perpendicular to the flow of fresh seawater. Preferably, the oxidation agent supply is a system of aeration pipes with each pipe in a spaced apart parallel arrangement with respect to the other pipes, extending perpendicular to the flow of fresh seawater and occupying the inclined bottom. The waterfall flow of the fresh seawater, effluent seawater and oxidation agent into the first and second ponds provides pH recovery with decarboxylation and oxygenation thereto to produce neutralized effluent seawater for environmental release such as in the ocean. Further according to the subject system, one or more water quality sensors are arranged in one or more of the basin, the first pond, and the second pond for use to control the effluent seawater treatment. As such, a control unit receives signals from one or more water quality sensors arranged in one or more of the basin, the first pond, and the second pond, and based on the signals received, the control unit controls one or more of the effluent seawater treatment parameters to efficiently produce neutralized effluent seawater for release to the environment, such as the ocean.

Further objects and features of the subject disclosure will be apparent from the description and the claims below.

BRIEF DESCRIPTION OF THE DRAWINGS

The subject disclosure will now be described in more detail with reference to the appended drawings in which.

DETAILED DESCRIPTION

Figure 1:
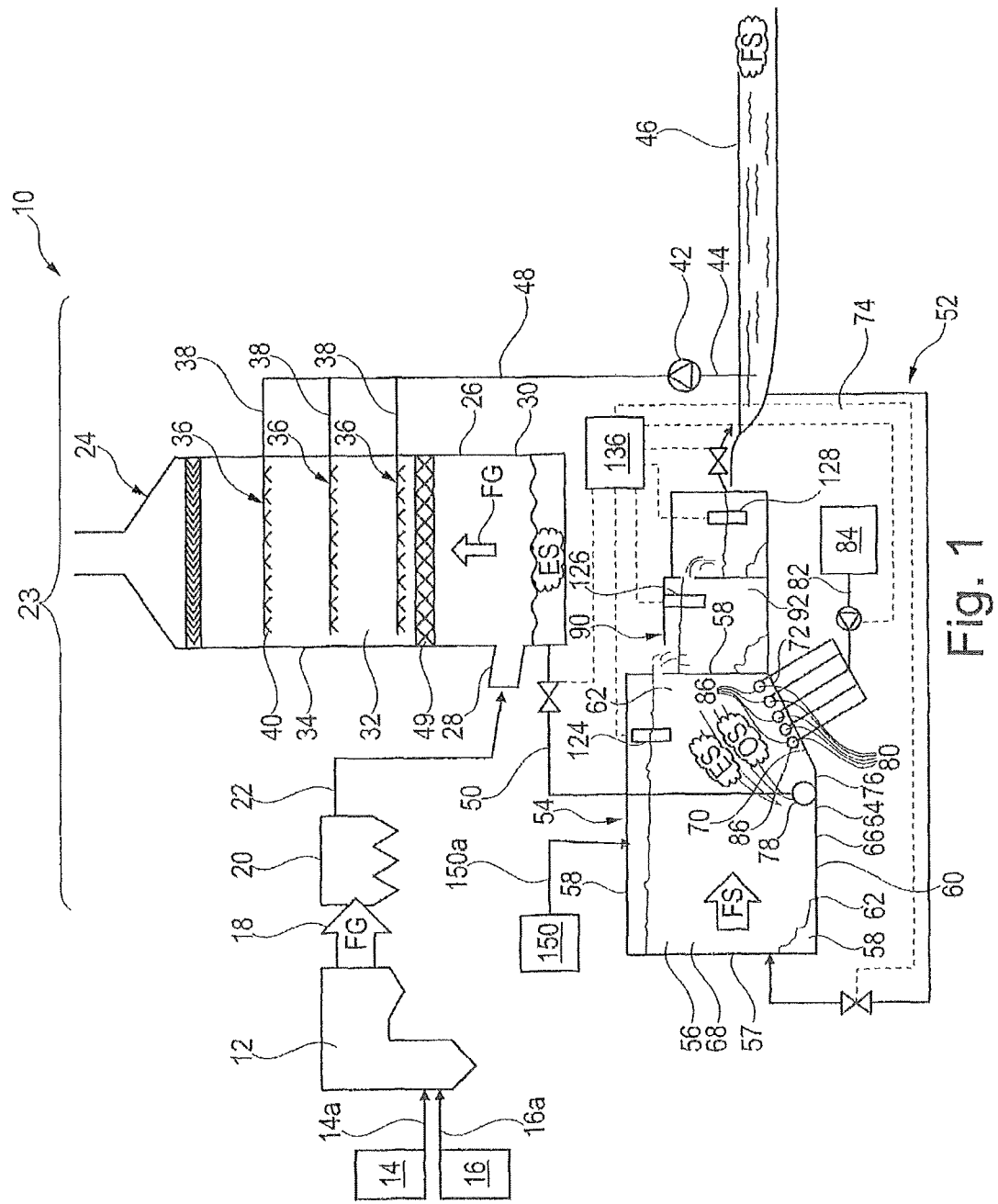
FIG. 1 is a schematic side cross-section view of a power plant with a seawater based gas cleaning system.

Illustrated in FIG. 1 is a schematic side cross-section view of a power plant 10. Power plant 10 comprises a boiler 12 in which a fuel, such as coal, oil, peat, natural gas, or waste, supplied from a fuel source 14 via feeding pipe 14a is combusted in the presence of oxygen, supplied from an oxygen source 16 via oxygen supply duct 16a. Oxygen may, for example, be supplied in the form of air and/or in the form of a mixture of oxygen gas and recirculated gases, in case boiler 12 is a so-called "oxy-fuel" boiler. The combustion of fuel generates a hot process gas in the form of a flue gas FG. Sulfur species contained in the fuel upon combustion form, at least partly, sulfur dioxide, $SO_2$, which forms part of the flue gas FG.

The flue gas FG flows from boiler 12 via a fluidly connected duct 18, to an optional dust removal device 20. A dust removal device 20, such as an electrostatic precipitator is described in U.S. Pat. No. 4,502,872, which serves to remove dust particles from the flue gas FG. As an alternative, another type of dust removal device 20 may be used, such as for example, a fabric filter as described in U.S. Pat. No. 4,336,035.

Flue gas FG from which most of the dust particles have been removed, flows from the dust removal device 20 via a fluidly connected duct 22 to a seawater flue gas desulfurization system 23 seawater scrubber 24. Seawater scrubber 24 comprises a wet scrubber tower 26. An inlet 28 is arranged at a lower portion 30 of wet scrubber tower 26. Duct 22 is fluidly connected to inlet 28 such that flue gas FG flowing from dust removal device 20 via duct 22 enters interior 32 of wet scrubber tower 26 via inlet 28.

After entering interior 32, flue gas FG flows vertically upward through wet scrubber tower 26, as indicated by arrow FG. Central portion 34 of wet scrubber tower 26 is equipped with a number of spray arrangements 36 arranged vertically one above each other. In the example of FIG. 1, there are three such spray arrangements 36, and typically there are 1 to 20 such spray arrangements 36 in a wet scrubber tower 26. Each spray arrangement 36 comprises a supply pipe 38 and a number of nozzles 40 fluidly connected to each supply pipe 38. Seawater supplied via supply pipes 38 to nozzles 40 is atomized by means of nozzles 40 and contacts in interior 32 of wet scrubber tower 26, the flue gas FG for absorption of sulfur dioxide, $SO_2$, therefrom.

A pump 42 is arranged for pumping fresh seawater FS via fluidly connected suction pipe 44 from ocean 46, and forwarding the fresh seawater FS via fluidly connected pressure pipe 48 to fluidly connected supply pipes 38.

In accordance with an alternative embodiment, fresh seawater FS supplied by pump 42 to supply pipes 38 may have been previously utilized as cooling water in steam turbine systems (not shown) associated with boiler 12 prior to such fresh seawater FS being utilized as scrubbing water in seawater scrubber 24.

Seawater atomized by nozzles 40 in interior 32 of wet scrubber tower 26 flows downwardly within wet scrubber tower 26 and absorbs sulfur dioxide from flue gas FG flowing vertically upwardly within interior 32 of wet scrubber tower 26. As a result of such absorption of sulfur dioxide by the seawater, the fresh seawater FS gradually turns into effluent seawater ES as it flows downwardly within interior 32 of wet scrubber tower 26. Effluent seawater ES is collected in lower portion 30 of wet scrubber tower 26 and is forwarded, via fluidly connected effluent pipe 50, from wet scrubber tower 26 to an effluent seawater treatment system 52.

In accordance with an alternative embodiment, the seawater scrubber 24 may comprise one or more layers of a packing material 49 arranged within interior 32 of wet scrubber tower 26. Packing material 49 may be made from plastic, steel, wood, or another suitable material for enhanced gas-liquid contact. With packing material 49, nozzles 40 merely distribute fresh seawater FS over packing material 49, rather than atomizing the fresh seawater FS. Examples of packing material 49 include Mellapak™ (available from Sulzer Chemtech AG, Winterthur, CH) and Pall™ rings (available from Raschig GmbH, Ludwigshafen, DE).

Effluent seawater treatment system 52 comprises three zones. The first zone 54 comprises a basin 56 with a first wall 57, opposed side walls 58 (illustrated in break-away), weir wall 59 and bottom 60. The distance between opposed side walls 58 is at least approximately 20 meters to approximately 40 meters. Bottom 60 of basin 56 defines two areas 62. A first area 64 comprises a flat bottom 66 beginning at first wall 57 of basin 56. First area 64 is approximately 10 meters to approximately 20 meters in length extending from first wall 57 toward weir wall 59. Abutting first area 64 flat bottom 66 is second area 70. Second area 70 comprises an inclined bottom 72 beginning at flat bottom 66 of basin 56. Second area 70 is approximately 20 meters to approximately 30 meters in length extending from flat bottom 66 to weir wall 59. At weir wall 59, inclined bottom 72 is elevated to a level 72a approximately 2.5 meters to approximately 3.5 meters above a level 72b of inclined bottom 72 at flat bottom 66 whereby inclined bottom 72 is inclined. In first area 64, the seawater is approximately 6 meters deep. In second area 70, the seawater is at its shallowest point at weir wall 59 approximately 2 meters to approximately 2.5 meters deep. Fresh seawater FS is supplied to basin 56 from a fresh seawater source or ocean 46. As such, fresh seawater FS is supplied from the fresh seawater source or ocean 46 via pipe 74 through fluidly connected first wall 57 heading basin 56 for a flow of fresh seawater FS from first wall 57 of basin 56 downstream toward weir wall 59. In first area 64 adjacent to second area 70 is an effluent seawater distribution pipe 76. Effluent seawater distribution pipe 76 is fluidly connected to effluent pipe 50, from wet scrubber tower 26. Effluent seawater distribution pipe 76 is arranged horizontally extending perpendicular to and between opposed side walls 58 of basin 56 at flat bottom 66. Effluent seawater distribution pipe 76 comprises a plurality of apertures 78 through which effluent seawater ES from scrubber tower 26 flows into fresh seawater FS contained in interior 68 of basin 56. As such, the flow of fresh seawater FS from first wall 57 to weir wall 59 carries the flow of effluent seawater ES from apertures 78 downstream toward weir wall 59. In second area 70, a plurality of aeration pipes 80 is arranged horizontally extending perpendicular to and between opposed side walls 58. Each of the plurality of aeration pipes 80 is fluidly connected to a common supply pipe 82 fluidly connected to an aeration source 84. Aeration source 84 supplies air, oxygen or other source of oxygen OS as an oxidation agent through supply pipe 82 and aeration pipes 80 to basin 56. As such, each aeration pipe 80 comprises a plurality of apertures 86 through which air, oxygen or other source of oxygen OS flows into the fresh seawater FS and effluent seawater ES contained in interior 68 of basin 56. The air, oxygen or other source of oxygen OS flows out of apertures 86 at a pressure of approximately 30 kPa to approximately 50 kPa (approximately 4.35 psi to approximately 7.25 psi) so as to contact the flow of effluent seawater ES in fresh seawater FS at approximately a 90 degree angle. Through the mixing of effluent seawater ES into a flow of fresh seawater FS and aeration thereof at approximately a 90 degree angle from inclined bottom 72, a relatively small basin 56 provides for improved mixing and aeration efficiency with a decrease in aeration power demand as compared to background commercial systems described above.

Figure 2:
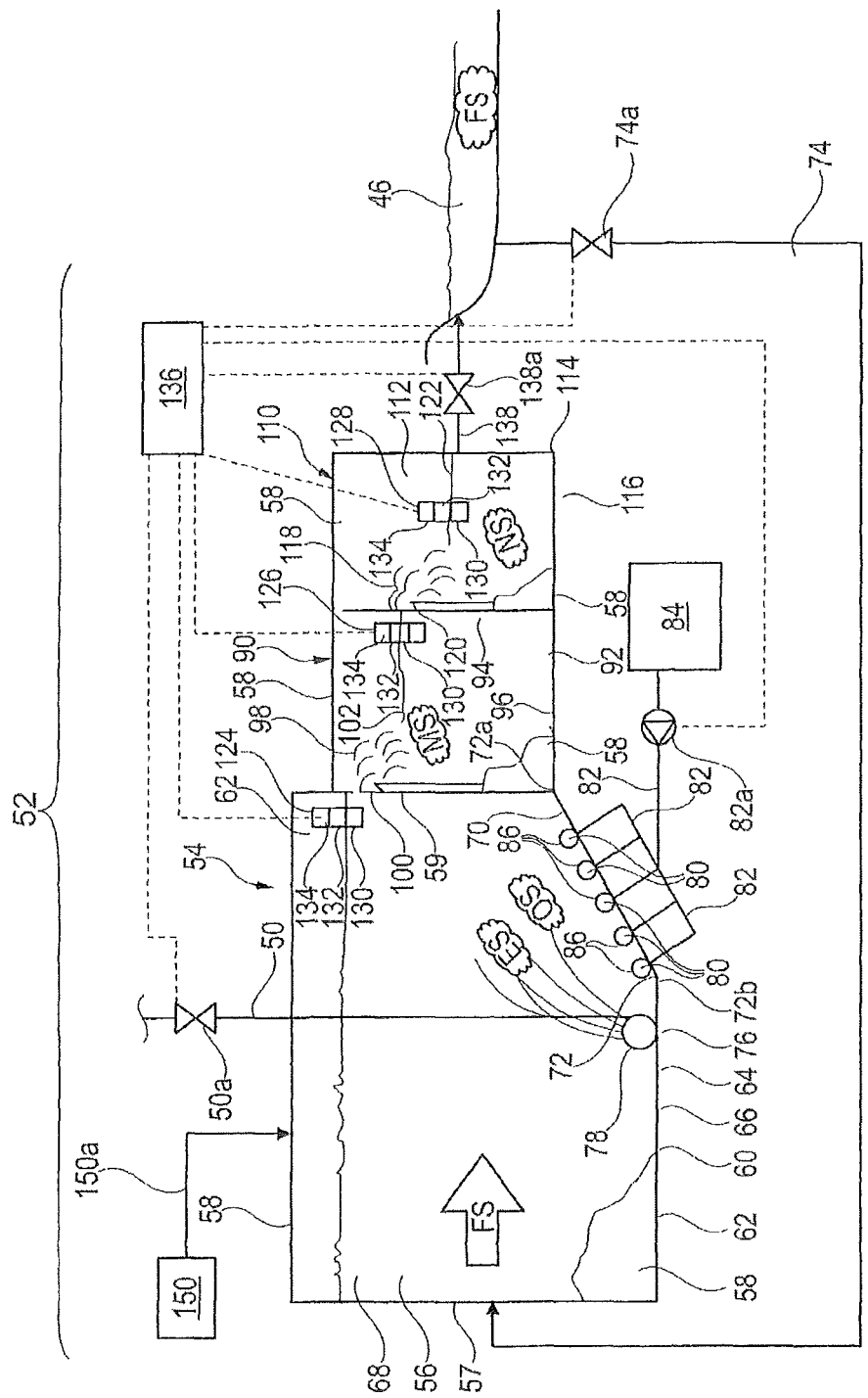
FIG. 2 is a schematic side cross-section view illustrating an effluent seawater treatment system in accordance with the subject disclosure.
Figure 3:
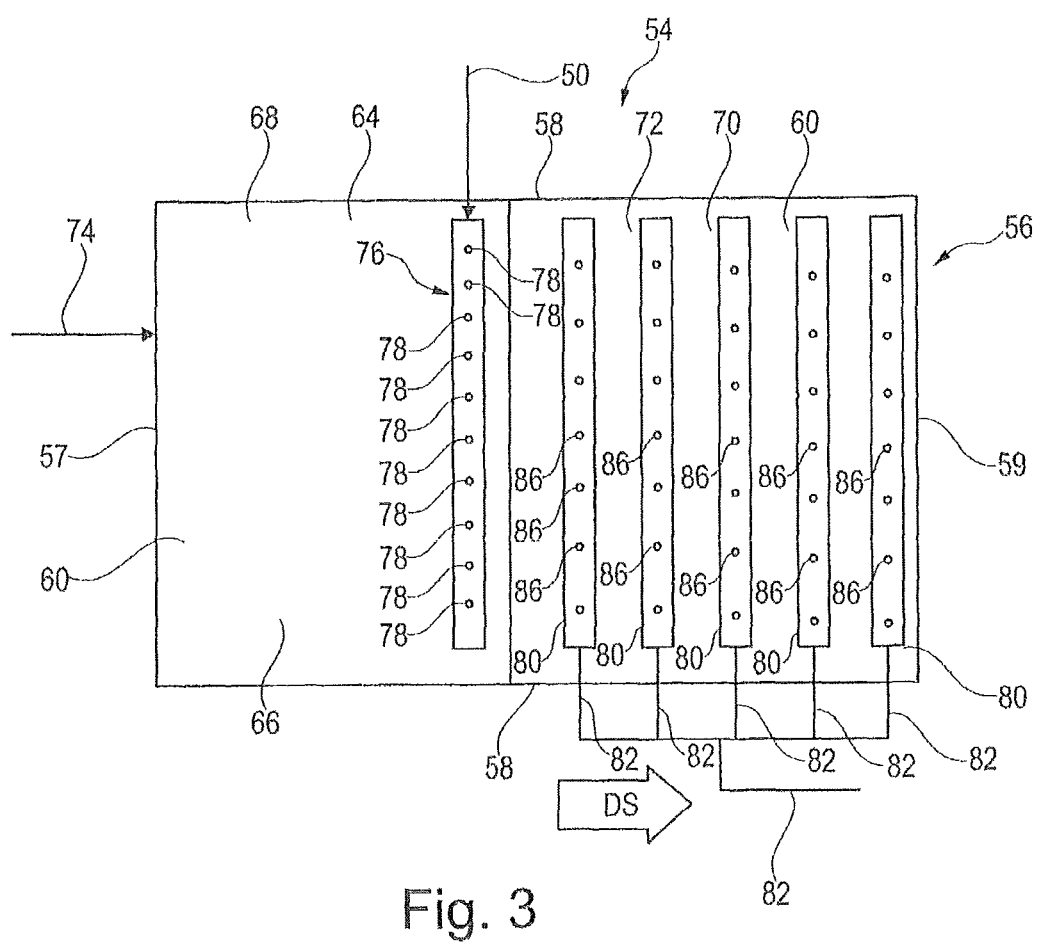
FIG. 3 is a top view illustrating a first embodiment of a basin of the effluent seawater treatment system of FIG. 2.
Figure 4:
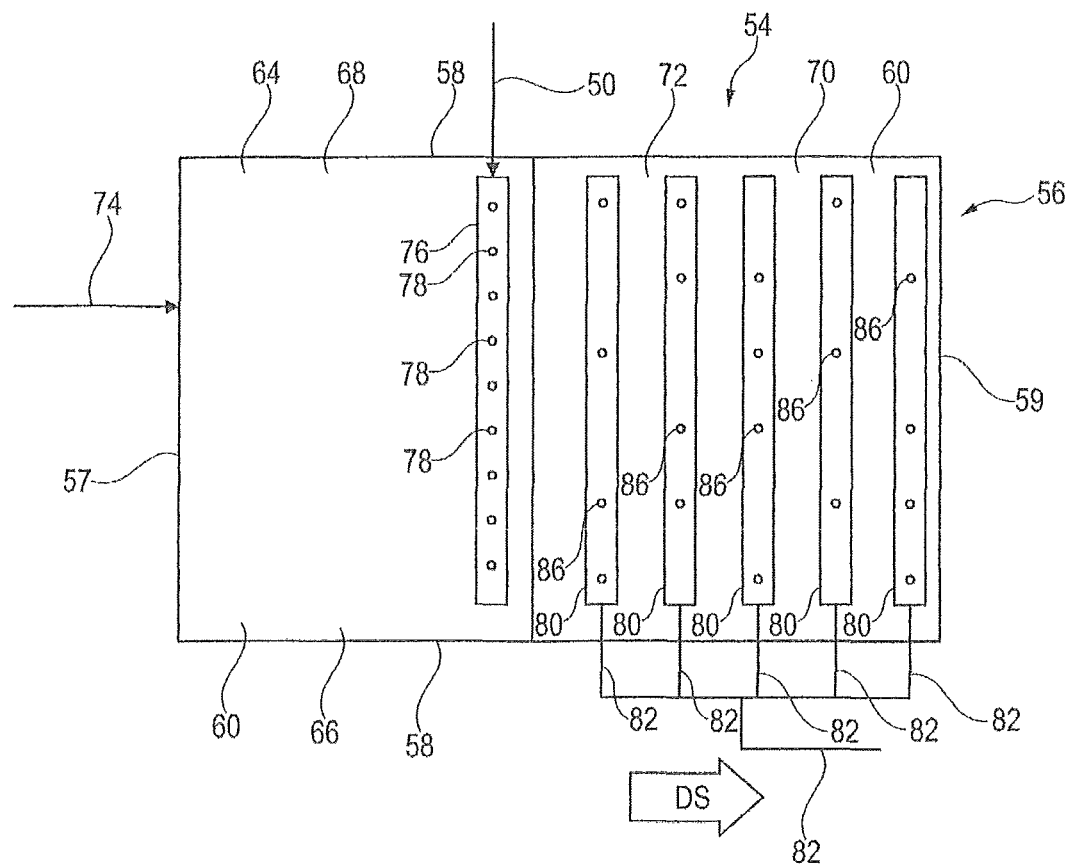
FIG. 4 is a top view illustrating a second embodiment of a basin of the effluent seawater treatment system of FIG. 2.
Figure 5:
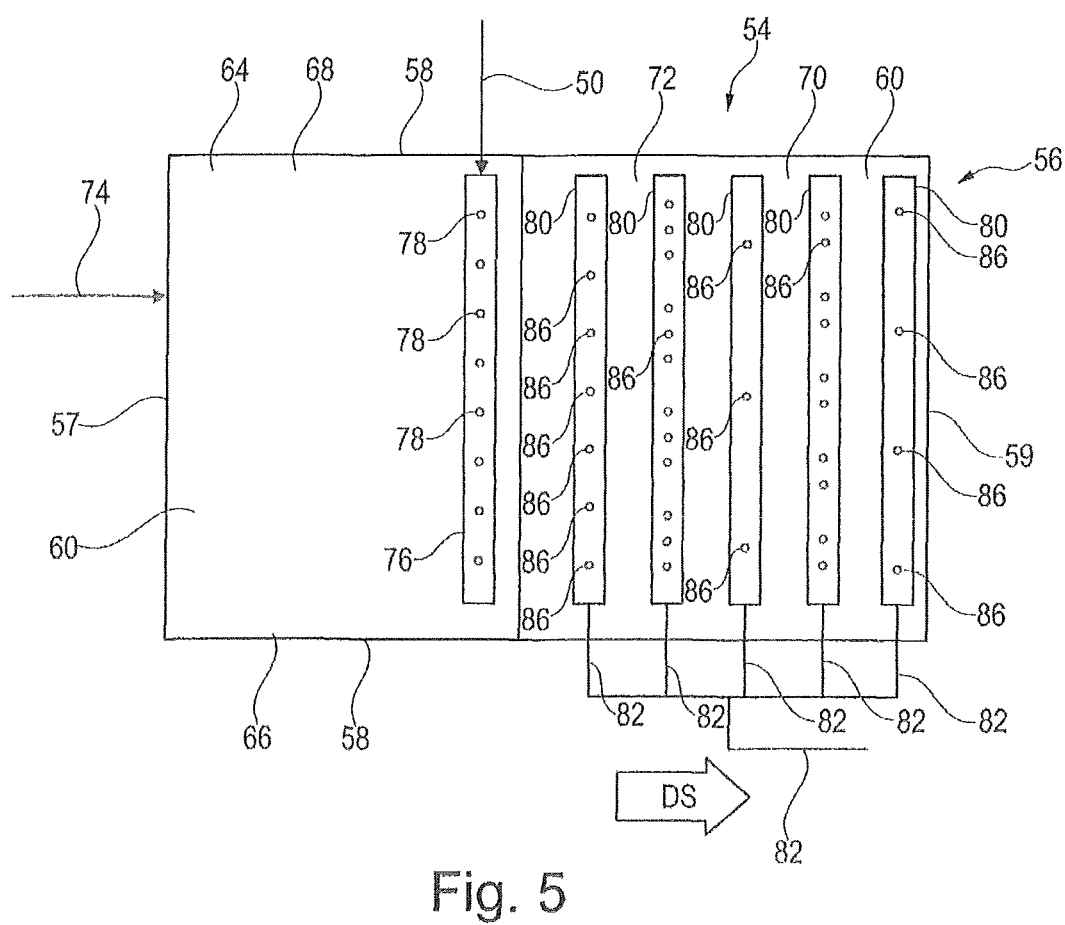
FIG. 5 is a top view illustrating a third embodiment of a basin of the effluent seawater treatment system of FIG. 2.

Illustrated in FIG. 2 is the subject effluent seawater treatment system 52 in more detail. In the subject effluent seawater treatment system 52, effluent seawater ES is supplied to basin 56 via the plurality of apertures 78 in effluent seawater distribution pipe 76. Effluent seawater distribution pipe is horizontally arranged at flat bottom 66 in first area 64 just upstream of second area 70 and inclined bottom 72. Effluent seawater ES from apertures 78 is mixed with and carried downstream by the flow of fresh seawater FS toward weir wall 59. The mixing flow of effluent seawater ES and fresh seawater FS is contacted at approximately a 90 degree angle by air, oxygen or other oxygen source OS as an oxidation agent spraying from apertures 86 of aeration pipes 80 horizontally arranged at inclined bottom 72 extending between opposed side walls 58 and configured so that each aeration pipe 80 is spaced apart from and parallel to each of the other aeration pipes 80. As best illustrated in FIGS. 3-5, apertures 86 in each aeration pipe 80 may be aligned (FIG. 3) with the apertures 86 of the other pipes 80, misaligned or staggered (FIG. 4) with apertures 86 of the other pipes 80, or random (FIG. 5) with apertures 86 of the other pipes 80 moving in a downstream direction represented by arrow DS. Through the mixing of effluent seawater ES into a flow of fresh seawater FS and aeration thereof at approximately a 90 degree angle from an inclined bottom 72, a relatively small basin 56, of an approximately 30 to approximately 40 percent decrease in size, provides for improved mixing and aeration efficiency with a decrease in aeration power demand, approximately 50 percent decrease in aeration power demand, as compared to background commercial systems described above.

The second zone 90 comprises a first auto recovery pond 92. First auto recovery pond 92 is defined by weir wall 59, opposed side walls 58, second weir wall 94 and bottom 96. First auto recovery pond 92 is approximately 2 meters to approximately 4 meters in length from weir wall 59 to second weir wall 94. The distance between opposed side walls 58 is at least approximately 20 meters to approximately 40 meters. Fresh seawater FS and effluent seawater ES mixed and aerated in first zone 54, produces mixed effluent seawater MS that flows over weir wall 59 in a waterfall 98 into first auto recovery pond 92. The depth of the mixed effluent seawater MS in first auto recovery pond 92 is approximately 2 meters to approximately 2.5 meters.

The top 100 of weir wall 59 is a minimum of approximately 0.5 meters above the surface 102 of mixed effluent seawater MS. Waterfall 98 provides pH recovery with decarboxylation and oxygenation of mixed effluent seawater MS.

The third zone 110 comprises a second auto recovery pond 112. Second auto recovery pond 112 is defined by second weir wall 94, opposed side walls 58, end wall 114 and bottom 116. Second auto recovery pond 112 is approximately 2 meters to approximately 4 meters in length from second weir wall 94 to end wall 114. The distance between opposed side walls 58 is at least approximately 20 meters to approximately 40 meters. Mixed effluent seawater MS from first auto recovery pond 92 flows over second weir wall 94 in a waterfall 118 into second auto recovery pond 112. The depth of the mixed effluent seawater MS in second auto recovery pond 112 is approximately 2 meters to approximately 2.5 meters. The top 120 of second weir wall 94 is a minimum of approximately 0.5 meters above the surface 122 of mixed effluent seawater MS. Waterfall 118 provides pH recovery with decarboxylation and oxygenation of mixed effluent seawater MS to produce neutralized effluent seawater NS. The surface 122 of neutralized effluent seawater NS is at sea level, i.e., the same level as ocean 46. From second auto recovery pond 112, neutralized effluent seawater NS is released to the ocean 46 via return pipe 138.

The chemical reactions occurring in wet scrubber tower 26 and in effluent seawater treatment system 52 will now be described in more detail. The absorption of sulfur dioxide in interior 32 of wet scrubber tower 26, illustrated in FIG. 1, is assumed to occur according to the following reaction:

$$SO_2(g)+H_2O => HSO_3^-(aq)+H^+(aq) \quad [eq. 1.1a]$$

The bisulfite ions, $HSO_3^-$, may, depending on the pH value of the effluent seawater ES, dissociate further to form sulfite ions, $SO_3^{2-}$, in accordance with the following equilibrium reaction:

$$HSO_3^-(aq) <=> SO_3^{2-}(aq)+H^+(aq) \quad [eq. 1.1b]$$

Hence, as an effect of the absorption of sulfur dioxide, the effluent seawater ES will have a lower pH value as an effect of the hydrogen ions, $H^+$, generated in the absorption reaction, than that of the fresh seawater FS from the ocean 46, and will contain bisulfite and/or sulfite ions, $HSO_3^-$ and $SO_3^{2-}$, respectively. Bisulfite and/or sulfite ions are oxygen demanding substances, and the release thereof to the ocean 46 is restricted.

In the effluent seawater treatment system 52, oxygen gas, $O_2(g)$, contained in the air, oxygen or other source of oxygen OS supplied via aeration pipes 80 to basin 56 is dissolved in the mixing fresh seawater FS and effluent seawater ES over inclined bottom 72.

$$O_2(g) <=> O_2(aq) \quad [eq. 1.2a]$$

The bisulfite and/or sulfite ions, $HSO_3^-$ and/or $SO_3^{2-}$, are oxidized, at least partly, by reaction with the dissolved oxygen, in accordance with the following reactions:

$$HSO_3^- + H^+ + \tfrac{1}{2}O_2(aq) => SO_4^{2-} + 2H^+ \quad [eq. 1.2b]$$

$$SO_3^{2-} + 2H^+ + \tfrac{1}{2}O_2(aq) => SO_4^{2-} + 2H^+ \quad [eq. 1.2c]$$

Hence, as an effect of absorption of sulfur dioxide, and oxidation of the sulfite, hydrogen ions, $H^+$, are generated in the effluent seawater ES. The mixed effluent seawater MS comprises calcium carbonate, $CaCO_3$, which functions as an alkali to react with and neutralize the hydrogen ions, H. The neutralization could occur according to the following chemical reaction scheme. In a first step of the neutralization reaction, the carbonate ion, $CO_3^{2-}$, reacts with one hydrogen ion, and forms a bicarbonate ion, $HCO_3^-$:

$$CO_3^{2-}+H^+ <=> HCO_3^- \quad [eq. 2.1]$$

The formed bicarbonate ion, $HCO_3^-$, may then react with a further hydrogen ion, $H^+$, to form carbon dioxide, $CO_2$, in a dissolved state:

$$HCO_3^-+H^+ <=> CO_2(aq)+H_2O \quad [eq. 2.2]$$

Finally, the dissolved carbon dioxide, $CO_2$ (aq), is released to the atmosphere in gas form:

$$CO_2(aq) <=> CO_2(g) \quad [eq. 2.3]$$

All of the neutralization reactions, [eq. 2.1 to 2.3], are equilibrium reactions. That means that the complete route, from carbonate, $CO_3^{2-}$, to carbon dioxide, $CO_2$, in gas form will be rate limited by the slowest step. Of the neutralization reactions above, eq. 2.1 is the fastest, and eq. 2.2 is the slowest. Hence, eq. 2.2 will normally determine the rate at which hydrogen ions may be neutralized in the effluent seawater treatment system 52 to produce neutralized effluent seawater NS with a pH and dissolved oxygen concentration suitable for release back to ocean 46.

Government regulatory requirements regarding neutralized effluent seawater NS deemed acceptable for return to the ocean 46 often follow parameters including:

i) a sufficiently low amount of oxygen consuming substances, which is often referred to as the COD (chemical oxygen demand);

ii) a sufficiently high amount of oxygen; and iii) a suitable pH.

As such, in a seawater scrubber 24 of the type illustrated in FIG. 1, the concentration of oxygen consuming substances, COD, normally correlates very well to the concentration of sulfite in the effluent seawater ES. Using water quality sensors 124, 126, 128, each with a sulfite detecting element 130, an oxygen detecting element 132, and a pH detecting element 134, as best illustrated in FIG. 2, variations in the sulfite concentration, the oxygen concentration, and the pH, along effluent seawater treatment system 52 can be monitored and controlled.

The dissolution of oxygen in the effluent seawater ES, the oxidation of sulfite, and the neutralization of formed hydrogen ions to restore pH to produce neutralized effluent seawater NS, are each governed by interactions between the chemical reactions. Control unit 136, depicted in FIGS. 1 and 2, receives signals from each of the water quality sensors 124, 126, 128 and controls each control valve 50a in effluent pipe 50, control valve 74a in fresh seawater FS pipe 74, blower 82a in supply pipe 82, and control valve 138a in return pipe 138, to control effluent seawater treatment system 52 to ensure neutralized effluent seawater NS meets the regulatory requirements for oxygen content, COD and pH prior to release in ocean 46.

As an example according to the subject method, sulfite detecting elements 130 in water quality sensors 124, 126, 128 register sulfite concentrations too high in first water quality sensor 124. Signal transmission herein is indicated by the broken lines, as for example is illustrated between each water quality sensors 124, 126, 128 and control unit 136 in FIGS. 1 and 2. While the sulfite concentration measured by the third water quality sensor 128 may very well be within regulatory limits, there is a distinct risk that there may not be sufficient time to neutralize all hydrogen ions, $H^+$, formed according to eq. 2.1 to 2.3, since hydrogen ion formation extends throughout effluent seawater treatment system 52. When the control unit 136 receives such information from water quality sensors 124, 126, 128, it may control the blower 82*a* to allow more oxygen to be supplied to the effluent seawater ES. Optionally, control valve 74*a* may be adjusted to increase the supply of fresh seawater FS via pipe 74. Optionally, control valve 50*a* may be adjusted in effluent pipe 50 to decrease the supply of effluent seawater ES. As an effect of an increased supply of oxygen, an increase supply of fresh seawater FS and/or a decreased supply of effluent seawater ES, the sulfite concentration and the sulfate concentration are restored to their normal or desired concentrations.

As an example according to the subject method, sulfite detecting elements 130 of water quality sensors 124, 126, 128 measure a sulfite concentration relatively low already at the first water quality sensor 124. While the sulfite concentration, the oxygen concentration and the pH as measured by the third water quality sensor 128 are likely to be within the regulatory limits, there is a distinct risk that too much oxygen containing gas is being supplied to the effluent seawater ES, causing an increased amount of energy to be consumed by blower 82*a*. When the control unit 136 receives such information from water quality sensors 124, 126, 128, it may control the blower 82*a* so less oxygen is supplied to the effluent seawater ES. Optionally, control valve 74*a* may be adjusted to decrease the supply of fresh seawater FS via pipe 74. Optionally, control valve 50*a* may be adjusted in effluent pipe 50 to increase the supply of effluent seawater ES. As an effect of a decreased supply of oxygen, a decreased supply of fresh seawater FS and/or an increased supply of effluent seawater ES, the sulfite concentration and the sulfate concentration are restored to their normal or desired concentrations.

As an example according to the subject method, oxygen detecting elements 132 of water quality sensors 124, 126, 128 registers an oxygen concentration that is too low. Such a low concentration of oxygen is likely to reduce the rate of sulfite oxidation, potentially causing a risk that the concentration of sulfite in the effluent seawater ES may exceed regulatory limits, and/or that the pH in the effluent seawater ES may get too low. When the control unit 136 receives such information from the water quality sensors 124, 126, 128 it may control blower 82*a* to allow more oxygen to be supplied to the effluent seawater ES. As an effect of such increased supply of oxygen, the oxygen concentration is restored to its normal value.

As an example according to the subject method, oxygen detecting elements 132 of water quality sensors 124, 126, 128 register an oxygen concentration that is too high. Such a high concentration of oxygen indicates that too much of the oxygen containing gas is supplied to the effluent seawater ES, thus causing an increased amount of energy consumption by blower 82*a*. When the control unit 136 receives such information from water quality sensors 124, 126, 128, it may control blower 82*a* such that less oxygen is supplied to the effluent seawater ES. As an effect of such decreased supply of oxygen, the oxygen concentration is restored to its normal value.

As an example according to the subject method, pH detecting elements 134 of water quality sensors 124, 126, 128 register a pH value that is too low. Such a low pH for the neutralized effluent seawater NS may not be acceptable for release to the ocean 46. When the control unit 136 receives such information from the water quality sensors 124, 126, 128, it may control the blower 82*a* such that more air, oxygen or other oxygen source OS is supplied to the effluent seawater ES. The supplied air, oxygen or other oxygen source OS has the effect of improving the gasification and subsequent removal of carbon dioxide, $CO_2$, from the effluent seawater ES according to eq. 2.3 set forth above. Such removal of gaseous $CO_2$ improves the speed of neutralization of hydrogen ions according to eq. 2.1 and 2.2 set forth above. As an effect of such increased supply of air, oxygen or other oxygen source OS, the pH value is restored to its normal value.

As an example according to the subject method, pH detecting elements 134 of water quality sensors 124, 126, 128 register a pH value that is at a suitable level for neutralized effluent seawater NS release to the ocean 46 already at the second water quality sensor 126. While the pH value is within the regulatory limits, there is a distinct risk that too much air is being supplied to the effluent seawater ES, causing an increased amount of energy to be consumed by blower 82*a*. When the control unit 136 receives such information from water quality sensors 124, 126, 128, it may control the blower 82*a* such that less air, oxygen or other oxygen source OS is supplied to the effluent seawater ES. As an effect of such reduced supply of air, oxygen or other oxygen source OS, the pH value is restored to a more desirable normal value.

Hence, as illustrated through the above examples, control unit 136 controls, based on information/signals from water quality sensors 124, 126, 128, effluent seawater treatment system 52 for efficient operation thereof.

The control unit 136 may also be used for continuously supervising the sulfite concentration, and/or the oxygen concentration, and/or the pH value along effluent seawater treatment system 52, and for adjusting the supply of oxygen, the supply of fresh seawater FS, and/or the supply of effluent seawater ES via blower 82*a*, control valve 74*a* and/or control valve 50*a*, respectively. In this manner, process variations such as for example, varying concentrations of sulfur dioxide in the flue gas FG generated by boiler 12, varying boiler loads, varying oxidation conditions due to, for example, varying temperatures, varying concentrations of oxidation catalyzing dust particles in the flue gas FG, and the like can be taken into account and adjusted for in the effluent seawater treatment system 52 for efficient operation thereof. It is also possible, as an alternative, to utilize control unit 136 only during start-up of the effluent seawater treatment system 52, to tune operation thereof. Further, all such effluent seawater treatment system 52 adjustments could be made manually, as alternative to automatic control by control unit 136.

As still a further example according to the subject method, oxygen detecting elements 132 of water quality sensors 124, 126, 128 registers an oxygen concentration that is too low. Such a low concentration of oxygen is likely to reduce the rate of sulfite oxidation, potentially causing a risk that the concentration of sulfite in the effluent seawater ES may exceed regulatory limits, and/or that the pH in the effluent seawater ES may get too low. When the control unit 136 receives such information from the water quality sensors 124, 126, 128 it may control addition of an oxidation enhancing substance to the effluent seawater treatment system 52 from an oxidation enhancing substance source 150 via pipe 150*a*. The oxidation enhancing substance could be an oxidation enhancing catalyst, such as iron, Fe, manganese, Mn, cobalt, Co, or copper, Cu. Furthermore, the oxidation enhancing substance may also be an oxidizing enzyme. An example of the latter is a sulfite oxidase type of enzyme. A sulfite oxidase may be prepared in accordance with the teachings of the article "*Optimization of expression of human sulfite oxidase and its molybdenum domain*" by C A Temple, T N Graf, and K V Rajagopalan, published in Arch. Biochem. Biophys. 2000 Nov. 15; 383(2):281-7. As such, the amount or use of oxidation catalyst, and/or the amount or use of oxidation enzyme, as the case may be, is controlled by control unit 136 to obtain the desired oxidation rate.

In summary, the subject method of treating effluent seawater ES generated in removing sulfur dioxide from a process gas by contacting the process gas containing sulfur dioxide with seawater comprises supplying fresh seawater FS to a basin 56 for a flow thereof downstream through an effluent seawater treatment system 52, supplying the effluent seawater ES to the basin 56 from a flat bottom 66 of the basin 56 upstream of and adjacent to an inclined bottom 72 of the basin 56 for a flow of the effluent seawater ES in the flow of fresh seawater FS, spraying an oxidation agent from the inclined bottom 72 of the basin 56 at a pressure of approximately 30 kPa to approximately 50 kPa (approximately 4.35 psi to approximately 7.25 psi) to contact the flow of effluent seawater ES at an angle of approximately 90 degrees, flowing the fresh seawater FS, effluent seawater ES and oxidation agent over a first weir 59 into a first pond 92, and flowing the fresh seawater FS, effluent seawater ES and oxidation agent over a second weir 94 into a second pond 112 prior to environmental release thereof such as in ocean 46. As such, the effluent seawater ES is supplied to the basin 56 from an effluent seawater distribution pipe 76 horizontally arranged in, at, or adjacent to the flat bottom 66 perpendicular to the downstream flow of the fresh seawater FS. The oxidation agent for the subject method is one or more members selected from the group consisting of air, oxygen, and an oxygen source. Above the inclined bottom 72, the fresh seawater FS, effluent seawater ES and oxidation agent efficiently mix in a relatively small basin 56 area. After so mixing, the fresh seawater FS, effluent seawater ES and oxidation agent waterfall flow over the first and second weirs 59, 94 into the first and second ponds 92, 112 providing pH recovery with decarboxylation and oxygenation to produce neutralized effluent seawater NS for environmental release such as to ocean 46. Further to the method, one or more water quality sensors 124, 126, 128 are arranged in one or more of the basin 56, the first pond 92, and the second pond 112 for use to control the effluent seawater ES treatment. As such, a control unit 136 receives signals from the one or more water quality sensors 124, 126, 128 arranged in the one or more of the basin 56, the first pond 92, and the second pond 112 and based on the signals received, controls the effluent seawater ES treatment by adjusting one or more parameters of effluent seawater ES treatment.

In summary, the subject effluent seawater treatment system 52 for treating an effluent seawater ES generated in a wet scrubber 24 in which a process gas is brought into contact with seawater for removal of sulfur dioxide from said process gas, the effluent seawater treatment system 52 comprises a basin 56 comprising an area 64 with a flat bottom 66 upstream of and adjacent to an area 70 with an inclined bottom 72, a fresh seawater supply 46 supplying fresh seawater FS to an upstream head 57 of the basin 56 into the area 64 with the flat bottom 66 for a downstream flow thereof through the basin 56, an effluent seawater supply 76 arranged horizontally at the flat bottom 66 upstream of and adjacent to the inclined bottom 72 for an upward flow of effluent seawater ES into the downstream flow of fresh seawater FS, an oxidation agent supply 80 horizontally arranged at the inclined bottom 72 to spray an oxidation agent from an aeration source 84 at a pressure of approximately 30 kPa to approximately 50 kPa (approximately 4.35 psi to approximately 7.25 psi) for contact with the flow of effluent seawater ES at approximately a 90 degree angle, a first weir 59 downstream of the inclined bottom 72 for a waterfall flow of the fresh seawater FS, effluent seawater ES and oxidation agent into a first pond 92, and a second weir 94 downstream of the first pond 92 for a waterfall flow of the fresh seawater FS, effluent seawater ES and oxidation agent into a second pond 112 prior to environmental release thereof such as in an ocean 46. As such, the effluent seawater supply 76 is an effluent seawater distribution pipe 76 horizontally arranged in, at, or adjacent to the flat bottom 66 perpendicular to the flow of the fresh seawater FS. The oxidation agent of the subject system 52 is one or more members selected from the group consisting of air, oxygen, and an oxygen source. The oxidation agent supply 80 is one or more aeration pipes 80 horizontally arranged in, at, or adjacent to the inclined bottom 72 extending perpendicular to the flow of fresh seawater FS. Preferably, the oxidation agent supply 80 is a system of aeration pipes 80 with each pipe 80 in a spaced apart parallel arrangement with respect to the other pipes 80, extending perpendicular to the flow of fresh seawater FS and occupying the inclined bottom 72. The waterfall flow of the fresh seawater FS, effluent seawater ES and oxidation agent into the first and second ponds 92, 112 provides pH recovery with decarboxylation and oxygenation thereto to produce neutralized effluent seawater NS for environmental release such as to the ocean 46. Further according to the subject system 52, one or more water quality sensors 124, 126, 128 are arranged in one or more of the basin 56, the first pond 92, and the second pond 112 for use to control the effluent seawater ES treatment. As such, a control unit 136 receives signals from one or more water quality sensors 124, 126, 128 arranged in one or more of the basin 56, the first pond 92, and the second pond 112, and based on the signals received, the control unit 136 controls one or more of the effluent seawater ES treatment parameters to efficiently produce neutralized effluent seawater NS for release to the environment, such as the ocean 46.

While the subject method and system have been described with reference to a number of preferred embodiments, it will be understood by those skilled in the art that various changes may be made and equivalents may be substituted for elements thereof without departing from the scope thereof. In addition, many modifications may be made to adapt a particular situation or material to the teachings hereof without departing from the essential scope. Therefore, it is intended that the subject method and system not be limited to the particular embodiments disclosed as the best mode contemplated, but rather include all embodiments falling within the scope of the appended claims. Moreover, the use of the terms first, second, etc. do not denote any order or importance, but rather the terms first, second, etc. are used to distinguish one element from another.

The invention claimed is:

1. A method of treating effluent seawater generated in removing sulfur dioxide from a process gas by contacting the process gas containing sulfur dioxide with seawater comprising:
  supplying fresh seawater to a basin so that the fresh seawater flows downstream through an effluent seawater treatment system;
  supplying the effluent seawater to the basin from a flat bottom of the basin, and upstream of and adjacent to an inclined bottom of the basin, thereby providing a flow of the effluent seawater in the flow of fresh seawater;

directing an oxidation agent at an angle of approximately 90 degrees from the inclined bottom of the basin to contact the flow of effluent seawater;

flowing the fresh seawater, effluent seawater and oxidation agent over a first weir into a first pond; and flowing the fresh seawater, effluent seawater and oxidation agent over a second weir into a second pond prior to environmental release.

2. The method of claim 1, wherein the effluent seawater is supplied to the basin from an effluent seawater distribution pipe horizontally arranged in, at, or adjacent to the flat bottom perpendicular to the flow of the fresh seawater.

3. The method of claim 1, wherein the oxidation agent is one or more members selected from the group consisting of air, oxygen, and an oxygen source.

4. The method of claim 1, wherein above the inclined bottom, the fresh seawater, effluent seawater and oxidation agent mix.

5. The method of claim 1, wherein flowing the fresh seawater, effluent seawater and oxidation agent over the first and second weirs into the first and second ponds provides pH recovery with decarboxylation and oxygenation to produce neutralized effluent seawater for environmental release.

6. The method of claim 1, wherein one or more water quality sensors are arranged in one or more of the basin, the first pond, and the second pond for use to control the effluent seawater treatment.

7. The method of claim 1, wherein a control unit receives signals from one or more water quality sensors arranged in one or more of the basin, the first pond, and the second pond and based on the signals received, controls the effluent seawater treatment.

8. An effluent seawater treatment system for treating an effluent seawater generated in a wet scrubber in which a process gas is brought into contact with seawater for removal of sulfur dioxide from said process gas, the effluent seawater treatment system comprising:

a basin comprising an area with a flat bottom upstream of and adjacent to an area with an inclined bottom;

a fresh seawater supply supplying fresh seawater to an upstream head of the basin into the area with the flat bottom so that the fresh seawater flows downstream through the basin;

an effluent seawater supply arranged at the flat bottom, and upstream of and adjacent to the inclined bottom, thereby providing an upward flow of effluent seawater into the downstream flow of fresh seawater;

an oxidation agent supply arranged at the inclined bottom to direct an oxidation agent at an angle of approximately 90 degrees from the inclined bottom for contact with the flow of effluent seawater;

a first weir downstream of the inclined bottom for a waterfall flow of the fresh seawater, effluent seawater and oxidation agent into a first pond; and a second weir downstream of the first pond for a waterfall flow of the fresh seawater, effluent seawater and oxidation agent into a second pond prior to environmental release.

9. The system of claim 8, wherein the effluent seawater supply is an effluent seawater distribution pipe horizontally arranged in, at, or adjacent to the flat bottom perpendicular to the flow of the fresh seawater.

10. The system of claim 8, wherein the oxidation agent is one or more members selected from the group consisting of air, oxygen, and an oxygen source.

11. The system of claim 8, wherein the oxidation agent supply is one or more aeration pipes horizontally arranged in, at, or adjacent to the inclined bottom extending perpendicular to the flow of fresh seawater.

12. The system of claim 8, wherein the waterfall flow of the fresh seawater, effluent seawater and oxidation agent into the first and second ponds provides pH recovery with decarboxylation and oxygenation thereto to produce neutralized effluent seawater for environmental release.

13. The system of claim 8, wherein one or more water quality sensors are arranged in one or more of the basin, the first pond, and the second pond for use to control the effluent seawater treatment.

14. The system of claim 8, wherein a control unit receives signals from one or more water quality sensors arranged in one or more of the basin, the first pond, and the second pond, and based on the signals received, the control unit controls one or more of the effluent seawater treatment parameters.

15. The system of claim 8 wherein the oxidation agent supply is a system of aeration pipes with each pipe in a spaced apart parallel arrangement with respect to the other pipes, extending perpendicular to the flow of fresh seawater and occupying the inclined bottom.

* * * * *